United States Patent [19]
Shibata et al.

[11] Patent Number: 5,234,384
[45] Date of Patent: Aug. 10, 1993

[54] AUTOMATIC TENSIONER

[75] Inventors: Masato Shibata; Masanobu Yamazaki, both of Kosai, Japan

[73] Assignee: Fujikiko Kabushiki Kaisha, Tokyo, Japan

[21] Appl. No.: 766,577

[22] Filed: Sep. 27, 1991

[30] Foreign Application Priority Data

| Sep. 29, 1990 | [JP] | Japan | 2-260736 |
| Mar. 28, 1991 | [JP] | Japan | 3-19553[U] |
| Mar. 28, 1991 | [JP] | Japan | 3-65111 |
| Mar. 28, 1991 | [JP] | Japan | 3-65113 |
| Jul. 31, 1991 | [JP] | Japan | 3-60527[U] |

[51] Int. Cl.⁵ ............................................ F16H 7/12
[52] U.S. Cl. ............................................ 474/135
[58] Field of Search .................. 474/101, 133, 135

[56] References Cited

U.S. PATENT DOCUMENTS

| 4,689,037 | 8/1987 | Bytzek | 474/135 |
| 4,816,011 | 3/1989 | Kotzab | 474/135 X |
| 4,886,482 | 12/1989 | Koschmieder et al. | 474/135 X |

FOREIGN PATENT DOCUMENTS

| 0351630 | 1/1990 | European Pat. Off. |
| 0425246 | 5/1991 | European Pat. Off. |
| 3716570 | 12/1988 | Fed. Rep. of Germany |
| 2090936 | 7/1982 | United Kingdom |

Primary Examiner—Ramon S. Britts
Assistant Examiner—Roger J. Schoeppel
Attorney, Agent, or Firm—Hopkins & Thomas

[57] ABSTRACT

An automatic tensioner for applying a tension to a belt of an engine for a vehicle comprises a shaft fixedly mounted on a part of the vehicle. An arm has a proximal section which is supported by the shaft for angular movement thereabout, and a free end section of the arm is located on the side opposite to the proximal section. A pulley is supported by the free end section of the arm for angular movement thereabout and is in contact with the belt. A plate element is provided which is fixedly mounted on the shaft. A plurality of rolling elements are arranged between the proximal section of the arm and the plate element. The rolling element rolls between the proximal section of the arm and the plate element to support the proximal section for angular movement. The arm is moved angularly by a spring about the shaft to bias the pulley toward the belt.

10 Claims, 15 Drawing Sheets

5,234,384

AUTOMATIC TENSIONER

BACKGROUND OF THE INVENTION

This invention relates to an automatic tensioner for applying a tension to a belt such as a drive belt of an engine for a vehicle.

A conventional automatic tensioner is disclosed, for example, as illustrated in FIG. 1 (refer to Japanese Patent Publication No. SHO 02-2182). In FIG. 1, an automatic tensioner 1 is arranged as follows. That is, an arm 3 has a proximal section 3a which is mounted on a cylindrical housing 2 for angular movement thereabout. The arm 3 has a free end thereof adjacent to which an idler pulley 4 is mounted for angular movement. A torsion coil spring S is arranged between the housing 2 and the proximal section 3a of the arm 3, for applying a tension to a belt through the idler pulley 4. In order to angularly move smoothly the arm 3 with respect to the housing 2, a resin sleeve 6 is fitted into an annular space defined between an outer peripheral surface of the housing 2 and an inner peripheral surface of the proximal section 3a of the arm 3, which faces toward the outer peripheral surface of the housing 2.

The conventional automatic tensioner described above has the following problems. That is, since the arm 3 is moved angularly about the resin sleeve 6 which serves as a center of angular movement, as the resin sleeve 6 is worn off in a one-sided manner, mounting rattle occurs in the arm 3. Thus, nonuniformity in angular movement occurs in the arm 3, so that there is a fear that the tension on the belt is fluctuated.

For the reason discussed above, the resin sleeve 6 is required which is not only large in diameter, but also large in an axial direction, in an attempt to reduce a surface pressure of the resin sleeve C. Accordingly the automatic tensioner 1 becomes large in construction.

SUMMARY OF THE INVENTION

The invention has been done in order to solve the above-discussed problem and it is an object of the invention to provide an automatic tensioner in which an arm can smoothly be moved angularly, and which is small in size.

It is another object of the invention to provide an automatic tensioner in which mounting rattle in an axial direction at a proximal section of an arm can be eliminated.

It is still another object of the invention to provide an automatic tensioner in which heat treatment of an arm and a plate can be dispensed with.

It is further object of the invention to provide an automatic tensioner in which grease filled in a space defined between a proximal section of an arm and a plate can perfectly be prevented from escaping to the outside.

It is another object of the invention to provide an automatic tensioner in which a surface pressure applied to a fixed or stationary shaft can be reduced as far as possible, and a torque can be regulated or adjusted.

These and other objects can be achieved according to the present invention by providing an automatic tensioner for applying a tension to a belt of an engine for a vehicle, the automatic tensioner comprising:

a shaft fixedly mounted on a part of the vehicle:

an arm having a proximal section supported by the shaft for angular movement thereabout and a free end section located on the side opposite to the proximal section a pulley supported by the free end section of the arm for angular movement thereabout and in contact with the belt:

a plate element fixedly mounted on the shaft a plurality of rolling elements arranged between the proximal section of the arm and the plate element and capable of rolling between them: and biasing means for causing the arm to be moved angularly about the shaft to bias the pulley toward the belt.

Preferably the aforesaid automatic tensioner elements in an axial direction of the shaft. Preferably the biasing means includes a plurality of elastic elements. Further an X-ring is arranged between an end face of the proximal section of the arm and an end face of the plate element which are opposed to each other to hermetically close a location between the end faces. Furthermore antifriction means is arranged at an abutment of at least one of the proximal section of the arm and the plate element, which is abutted against the rolling elements.

The automatic tensioner further including a detent element for preventing the shaft from being moved angularly about an axis thereof. The detent element has a proximal end fixedly mounted on the shaft and a forward end fixedly mounted on the plate element. A slot is formed in an abutment of the plate element against the detent element and extends about the shaft. The detent element has a forward end which is loosely fitted in the slot. A spacer is capable of being arranged on one side of the slot such that the detent element is moved angularly in a direction tightening the spring means.

BRIEF DESCRIPTION OF THE DRAWINGS

FIG. 3 is a view for explanation of layout of balls illustrated in FIG. 4;

DETAILED DESCRIPTION OF THE PREFERRED EMBODIMENTS

Various embodiments of the invention will be described below with reference to the accompanying drawings.

FIRST EMBODIMENT

Figure 1:
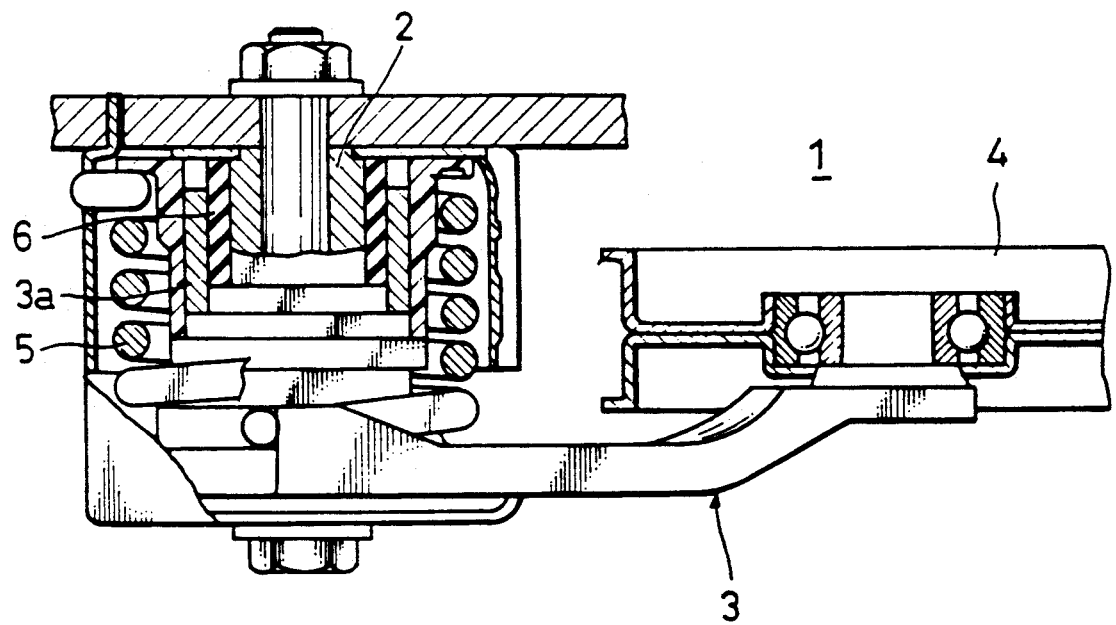
FIG. 1 is a cross-sectional view of a conventional automatic tensioner.
Figure 2:
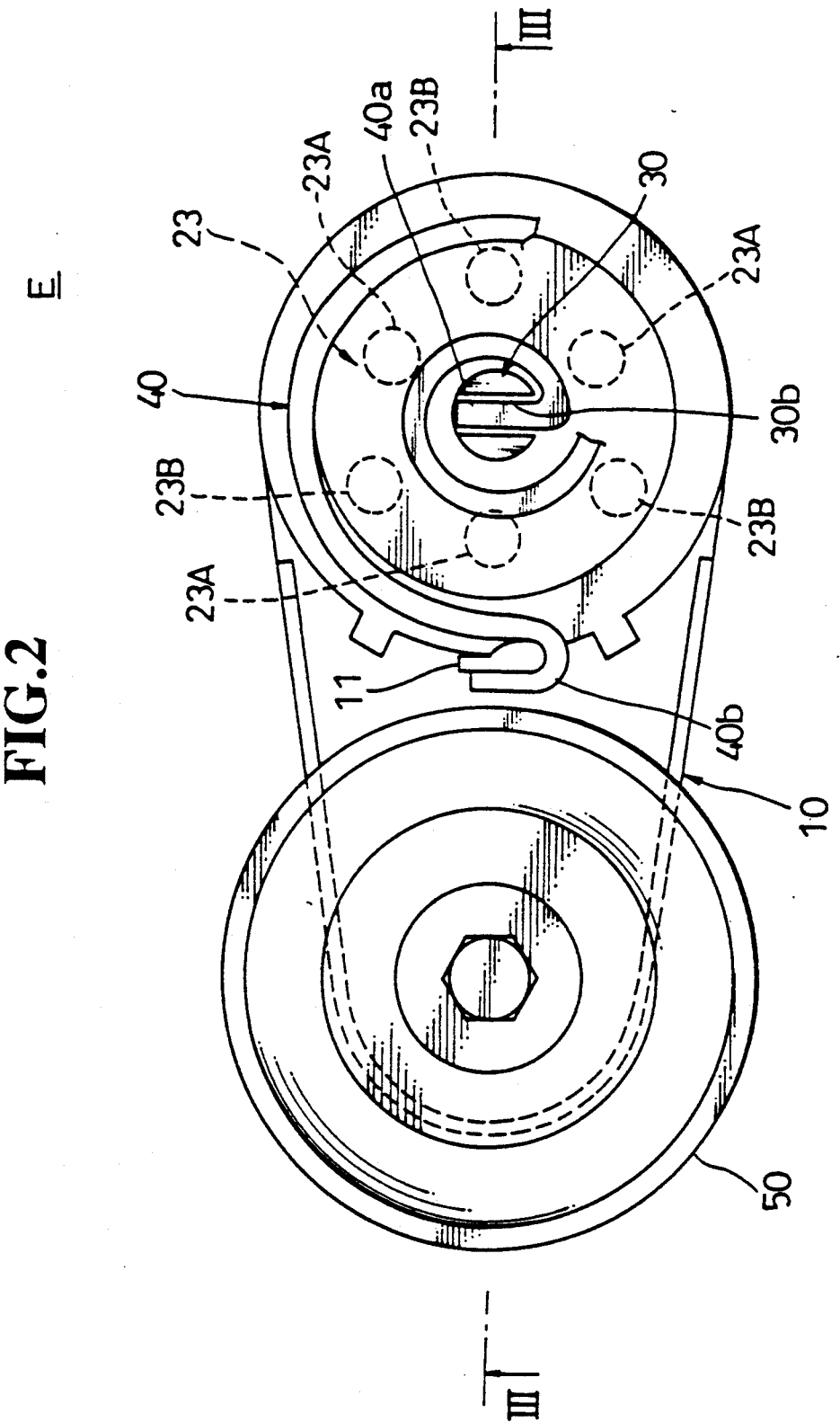
FIG. 2 is a view for explanation of an automatic tensioner according to a first embodiment of the invention.
Figure 3:
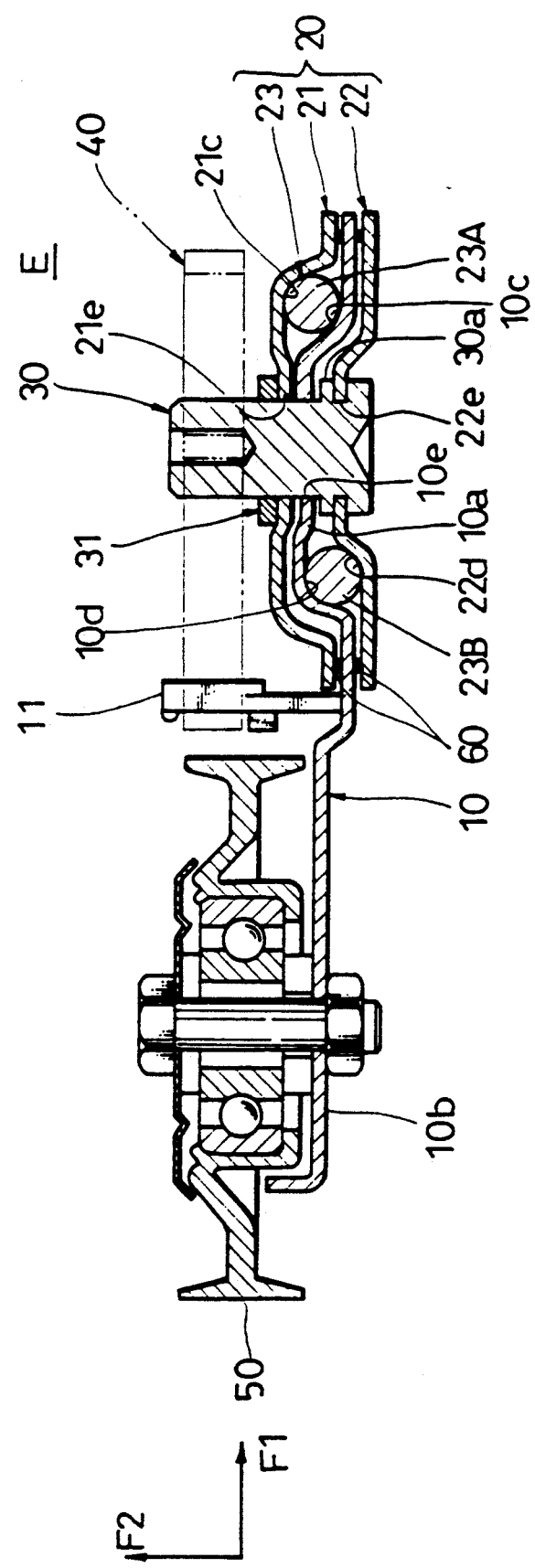
FIG. 3 is a cross-sectional view for explanation taken along a line III—III in FIG. 2.

Referring first to FIGS. 2 and 3, there is shown an automatic tensioner E, according to a first embodiment of the invention, which applies a tension to a belt (not shown) such as a drive belt of an engine for a vehicle. The automatic tensioner E has an arm 10 whose proximal section 10a is supported by a fixed or stationary shaft for angular movement thereabout through sliding means 20 so arranged as to clamp both end faces of the proximal end 10a. A spring 40 is interposed between the stationary shaft and the arm 10. By a biasing force of the spring 40, the arm 10 is moved angularly about the stationary shaft 30, to apply a tension to the belt through an idler pulley which is mounted on a pin at a location adjacent to a free end 10b of the arm 10.

More particularly, the sliding means 20 comprises a set of ball retaining plates 21 and 22 each in the form of a disc, and a plurality of balls 23. As shown in FIG. 3, the ball retaining plate 21 is arranged at an upper location, and the ball retaining plate 22 is arranged at a lower location, so as to clamp both faces of the proximal section 10a of the arm 10 which is formed into a disc shape.

A plurality of, for example, three (3) ball receiving sections 10c and 21c are formed in spaced relation to each other at predetermined intervals in the circumferential direction, respectively on the proximal section 10a of the arm 10 and the ball retaining plate 21. Similarly three (3), for example, ball receiving sections 10d and 22d are also formed, in spaced relation to each other at predetermined intervals in the circumferential direction, respectively on the proximal section 10a of the arm 10 and the ball retaining plate 22, in alternate relation to the above-described ball retaining sections 10c and 21c. Balls 23A and 23B are received respectively between the ball receiving sections 10c and 21c and between the ball receiving sections 10d and 22d.

The stationary shaft has a lower end in the figure, which is formed with a flange section 30a. when the arm 10 and the ball retaining plates 21 and 22 are assembled with the stationary shaft 30, the stationary shaft is inserted through a bore 22a formed in the ball retaining plate 22 such that a lower face of the flange section 30a is abutted against an upper surface of the ball retaining plate 22, and the stationary shaft projecting from the lower face of the ball retaining plate 22 is caulked. Thus, the ball retaining plate 22 is fixedly mounted on the stationary shaft 30. In this connection, in place of the caulking, the ball retaining element 22 may be fixedly mounted on the stationary shaft by welding or the like.

Subsequently, the balls 23B are interposed between the predetermined ball receiving sections 10d and 22d, and a bore 10e formed in the proximal section 10a of the arm 10 is inserted about the stationary shaft 30.

Subsequently, the balls 23A are interposed between the predetermined ball receiving sections 10c and 21c, and a bore 21e formed in the ball retaining plate 21 is inserted about the stationary shaft 30. Subsequently, a snap-ring 31 or the like is inserted about the stationary shaft 30, and is fixedly mounted thereto, so that the arm 10 and the ball retaining plates 21 and 22 are prevented from moving in the axial direction.

Further, grease is filled in spaces which are defined by the proximal section 10a of the arm 10 and the ball retaining plates 21 and 22. The grease is prevented from escaping to the outside by O-rings 80 which are forcibly fitted into the peripheral sections of the respective ball retaining plates 21 and 22. Furthermore, the O-rings 60 have also a function of preventing dirt and dust from invading from the outside.

In connection with the above, the ball retaining plate 22 is adapted to be fixedly mounted on an engine or the like by mounting bolts (not shown).

The spiral spring 40 serving as an example of a spring has a proximal section 40a which is inserted into a cut-out groove 30b formed in the upper end of the stationary shaft 30. The spiral spring 40 is prevented from falling off from the stationary shaft 30 by caulking of the edge portion of the cut-out groove 30b at the upper end thereof. The spiral spring 40 has a free end 40b which is engaged with an engaging piece 11 provided integrally in the peripheral section of the proximal section 10a of the arm 10. In this connection, a torsion coil spring similar to a conventional one may be used as the spring 40.

The operation of the first embodiment according to the invention will next be described.

In FIG. 3, cooperating actions between the balls 23A and 23B and the ball receiving sections 10c and 21c and 10d and 22d can cope with an input in an F1 direction acting upon the idler pulley 30. Further, with respect to an input in an F2 direction acting upon the idler pulley 30, the proximal section 10a of the arm 10 is urged by the ball retaining plates 21 and 22 through the balls 23A and 23B in upper and lower directions, whereby it is possible to cope with the input in the F2 direction.

Furthermore, angular movement of the arm 10 is effected about the stationary shaft while the balls 23 are rotated. Accordingly, it is possible to prevent wear at the proximal section 10a of the arm 10. As a result, the angular movement of the arm 10 is always effected smoothly so that it is possible to prevent unevenness or nonuniformity in angular movement from occurring. Accordingly, it is possible to nullify fluctuation in tension applied to the belt. Moreover, it is possible to reduce the dimension in the axial direction so that miniaturization can be made possible.

Further, in the case where the spiral spring 40 is used as biasing means, it is possible to set the dimension in the axial direction to a considerably small one as compared with a conventional torsion coil spring. As a result, the dimension of the stationary shaft in the axial direction can be reduced and, furthermore, the entire automatic tensioner can be reduced in size.

Figure 4:
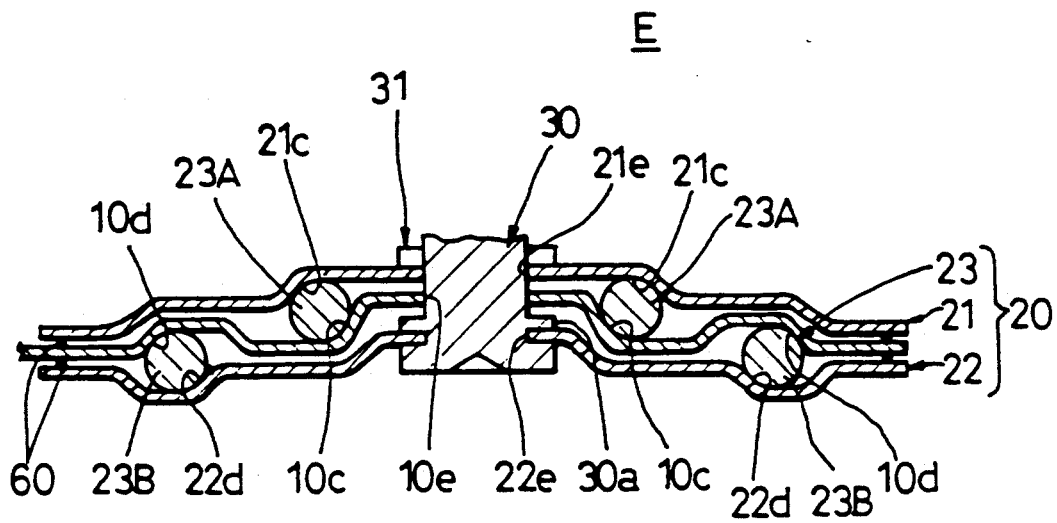
FIG. 4 is a cross-sectional view for explanation, showing another embodiment of sliding means.
Figure 5:
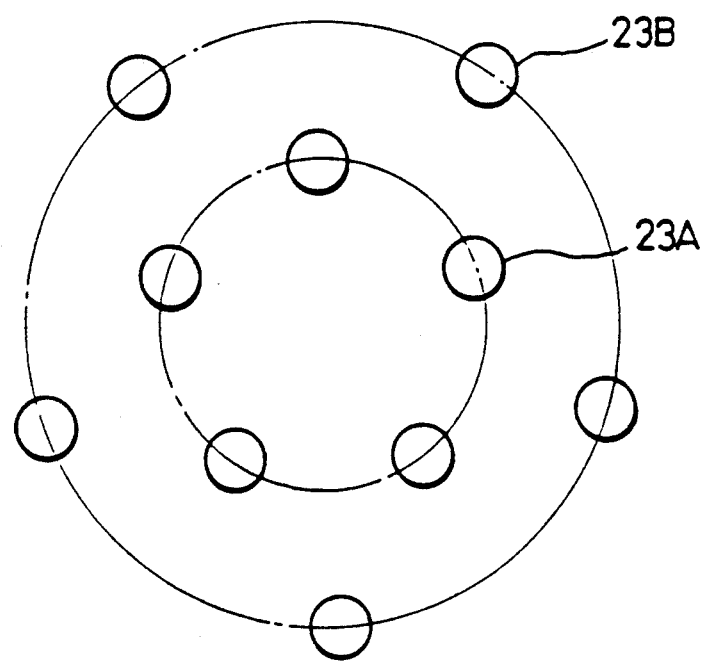

FIG. 4 is a cross-sectional view for explanation, showing a modification of the sliding means, while FIG. 5 is a view for explanation of the layout of the balls illustrated in FIG. 4.

As shown in FIGS. 4 and 3, in the case where the automatic tensioner E is large in size, the arrangement may be as follows. That is, for example, five (3) balls 23A and 23B are arranged between the arm 10 and the ball retaining plates 21 and 22 such that set radii of the balls 23A and 23B from the stationary shaft are different from each other.

According to the modification described above, a load received by a single ball is reduced. Accordingly, angular movement of the arm 10 can be made smooth and, further, the durability of the balls can be improved. This also improves the durability of the automatic tensioner E.

Figure 6:
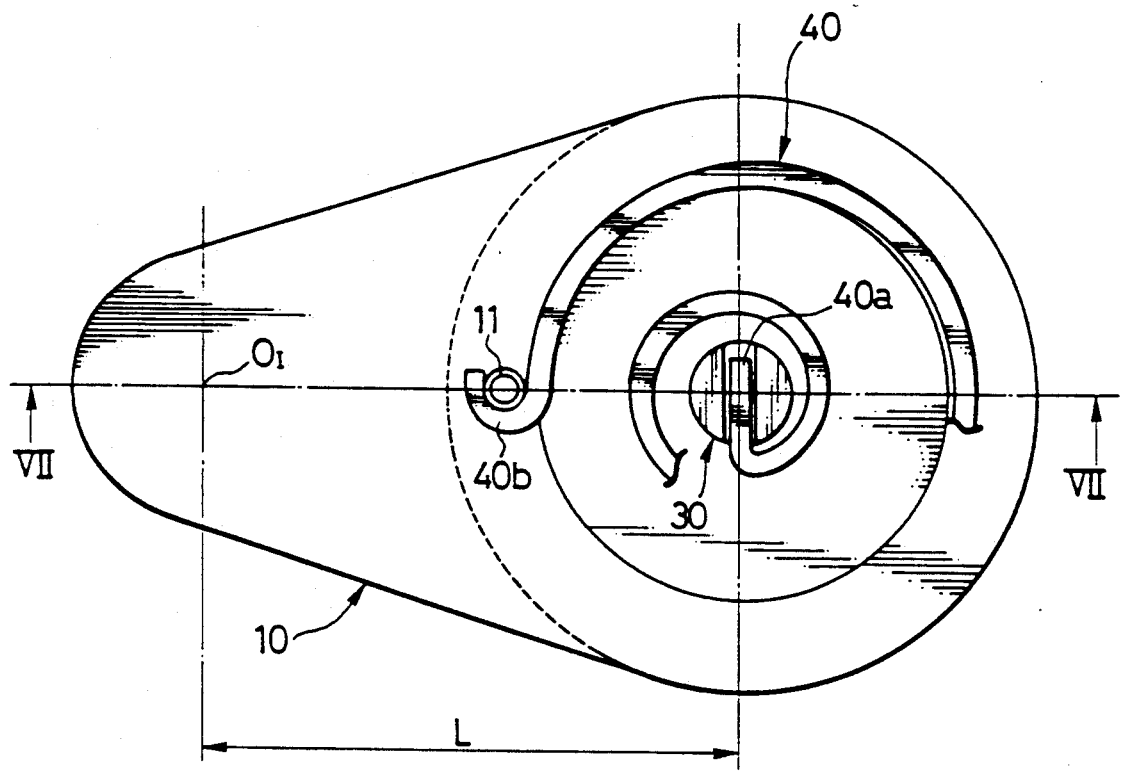
FIG. 6 is a view for explanation of still further modification of the first embodiment according to the invention.
Figure 7:
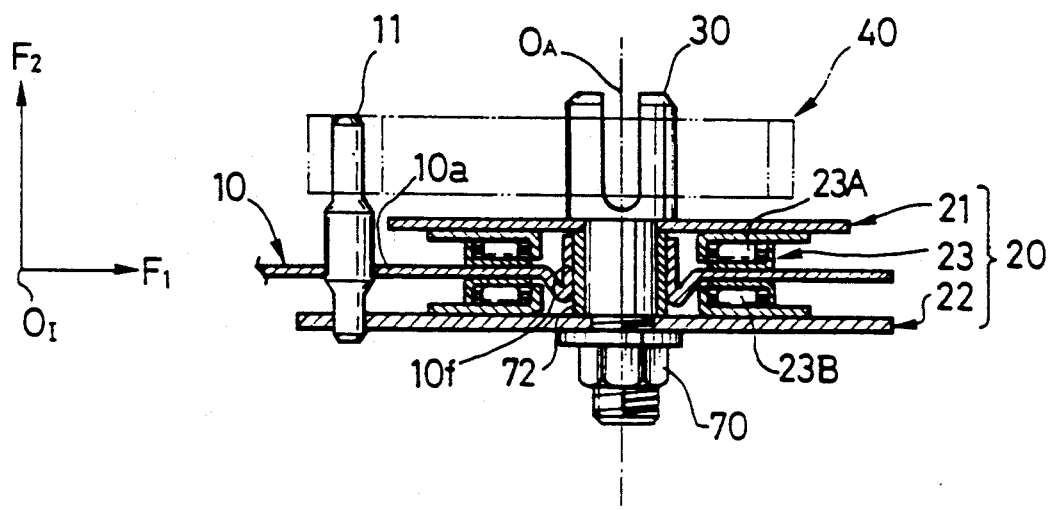
FIG. 7 is a cross-sectional view taken along a line VII—VII in FIG. 6.
Figure 8:
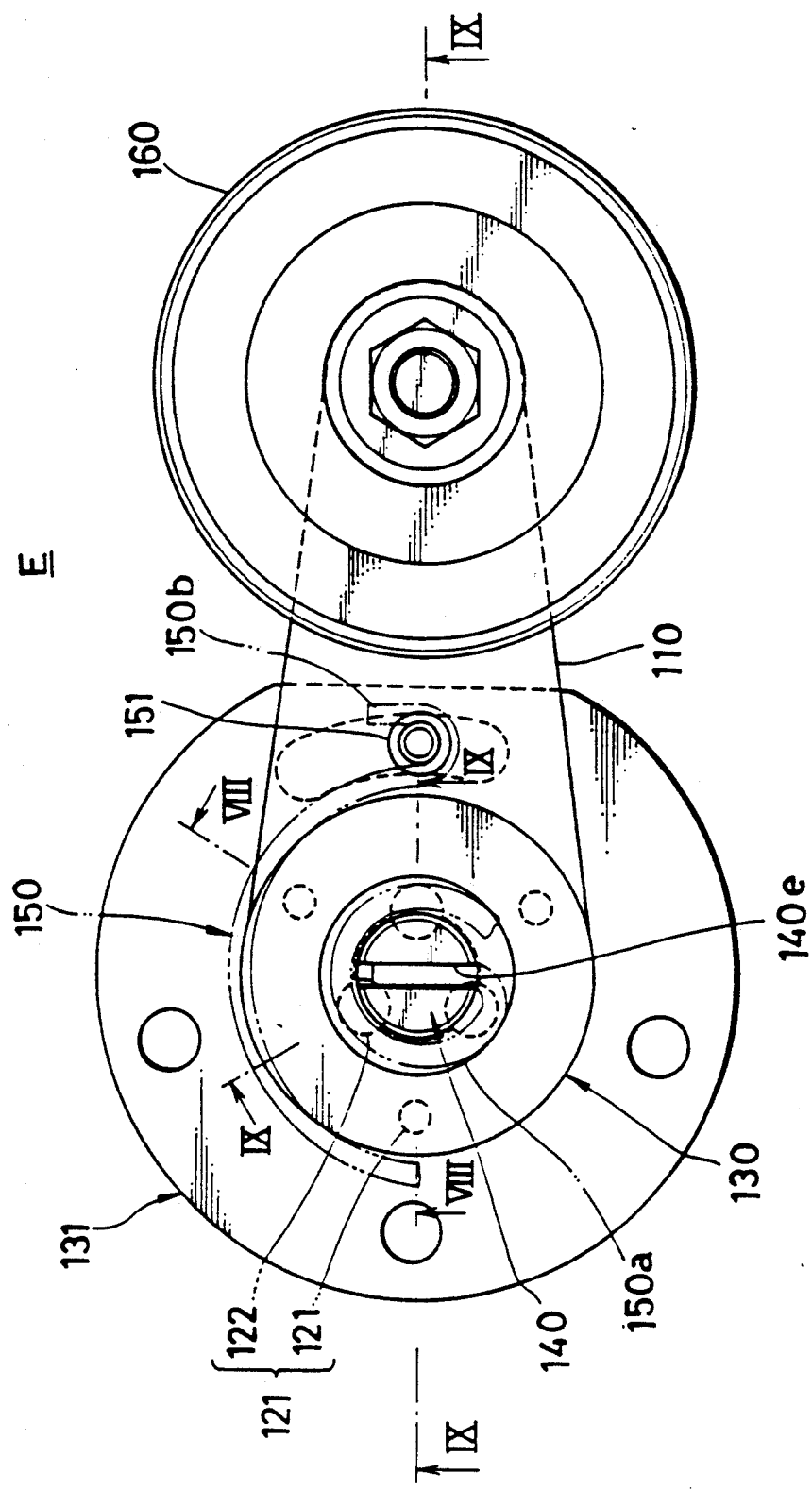
FIG. 8 is a top plan view for explanation of an automatic tensioner according to a second embodiment of the invention.

FIG. 6 is a view for explanation, showing a further different modification of the aforesaid first embodiment, while FIG. 7 is a cross-sectional view taken along the line VII—VII in FIG. 6. In FIGS. 6 and 7 components and parts identical with those illustrated in FIGS. 2 and 3 are designated by the like or similar reference numerals, and the description of the like or similar components and parts will be omitted to avoid repetition.

In this modification, the pair of ball retaining plates 21 and 22 are supported by the stationary shaft 30, and are tightened by a nut 70. A plurality of pairs of needle bearings 23A and 23B are arranged respectively on both sides of the proximal section 10a of the arm 10 and about the stationary shaft 30. These needle bearings 23A and 23B roll on the insides of the respective ball retaining plates 21 and 22.

A metal sliding bearing 72 in the form of a sleeve is fitted about the stationary shaft 30. An abutment 10f, which is abutted against the metal sliding bearing 72 to slide thereon, is provided on the side of the proximal section 10a of the arm 10 adjacent to the stationary shaft 30. The abutment 10f is so formed as to be bent or folded such that the side of the proximal section 10a adjacent to the stationary shaft extends along the metal sliding bearing 72. In this connection, the reference character $O_1$ indicates a center of angular movement of the idler pulley 30, while the reference character $O_A$ indicates a center of angular movement of the arm 10.

In this modification, it is possible to cope with the input in the F2 direction by the needle bearings 23A and 23B which are arranged on both sides of the proximal section 10a of the arm 10. Thus, it is possible to prevent play from occurring in the arm 10, and to prevent misalignment of the idler pulley from occurring and progressing. Further, it is possible to cope with the input in the F1 direction by the metal sliding bearing 72. In this case, impact or shock resistance in the F1 direction can be improved. In the case where there is the input in F1 direction, since the both sides of the proximal section 10a are held or retained respectively by the needle bearings 23A and 23B, the arm 10 changes slightly in length L. However no problem occurs. In this connection, by the use of the needle bearings 23A and 23B, there can also be produced an advantage that an attempt is made at compactification of the stationary shaft in the axial direction.

Second Embodiment

Referring to FIGS. 8 through 15, there is shown an automatic tensioner E, according to a second embodiment of the invention, which applies a tension to a belt (not shown) such as a drive belt of an engine for a vehicle. The automatic tensioner E has an arm 110 whose proximal section 111 is supported for angular movement by a stationary shaft 140 through a rolling element 120 so as to be clamped by a pair of plates 130 and 131. A spring 110 interposed between the stationary shaft 140 and the arm 110. By a biasing force of the spring 130, the arm 110 is moved angularly about the stationary shaft 140 so that a tension is applied to the belt through an idler puller 100 which is mounted on a side of the arm 110 at a free end thereof.

In this embodiment, biasing means 170 for biasing the rolling element 120 in an axial direction of the stationary shaft 140 is particularly arranged between the side of the arm 110 adjacent to the proximal section 111 thereof and the plates land 131. Furthermore, an antifriction element 180 is arranged at an abutment of the rolling element 120 which is arranged between the side of the arm 110 adjacent to the proximal section 111 thereof and the plate 131.

A structure or construction of the second embodiment will be described in further detail. The proximal section 111 of the arm 110 is formed into a circular cylinder, and is formed with a through bore 111a on an axis of the proximal section 111. The proximal section 111 has a lower portion in the FIGS. which is formed with a concentric cup-like recess 111b communicating with the through bore 111a. Further, the proximal section 111 has an upper face which is formed with three circular depressed grooves 111c arranged in predetermined intervals, for example, in equidistantly spaced relation to each other, on a circumference concentric with the through bore 111a on the outside of the recess 111b. The depressed grooves 111c are set such that subsidiary balls 121, which are small in diameter and which serve respectively as outside rolling elements, are loosely fitted respectively in the depressed grooves 111c. In this connection, the present embodiment has been described such that the depressed grooves 111c are formed on the outside of the recesses 111b. However, the depressed grooves may be arranged on the same circumference.

A larger-diameter section 140b is formed on an upper portion of the stationary shaft 140, and a smaller-diameter section 140c is formed on a lower portion of the stationary shaft 140, with a flange section 140a put between the larger-diameter section 140b and the smaller-diameter section 140c. The smaller-diameter section 140c has a lower end which is formed with a threaded section 140d. The holder plate which serves as an upper plate and the base plate 131 which serves as a lower plate are fixedly mounted on the smaller-diameter section 140c through a collar 181 such that the upper face of the holder plate 130 is abutted against a lower face of the flange section 140a. That is, the smaller-diameter section 140c is inserted through bores 130a, 181a and 131a which are formed in the holder plate 130, the collar 181 and the base plate 131 in order from the above. A nut 142 is tightened about the threaded section 140d projecting from the base plate 131, whereby the holder plate 130 and the base plate 131 are controlled or regulated in movement in the axial direction and are fixedly mounted on the stationary shaft 140. In this connection, fixing may be made by welding or caulking in place of the nut 142. Moreover, the base plate 131 is fixedly mounted on a mounting bracket or the like of the engine (not shown).

The collar 181 is the antifriction element 180 adjacent to the base plate 131 and is composed of a high-hardness material. The collar 181 has a lower end which is formed with a flange section 181b, and the collar 181 has an outer peripheral surface which is formed with a bulge section 181c. Three (3) arcuate cut-outs 181d are formed on the outer peripheral surface of the bulge section 181c at predetermined intervals in the peripheral direction, for example, at the same intervals so as to communicate with the upper face of the flange section 181b. Each of the cut-outs 181d has a radius of curvature which is set to one at least equal to or larger than the radius of a larger-diameter main ball 122 that is the inside sliding or rolling element.

A cup-like ball receiving element 182, which is made of a high-hardness material that is the antifriction element 180 on the side of the arm 110, is fitted in the recess 110b in the arm 110. The ball receiving element 182 has a bottom face which is formed with a bore 182a coaxial with the through bore 111a in the arm 110 and identical in diameter with the through bore 111a. The main ball 122 is so arranged as to be in contact with the inner peripheral surface of the ball receiving element 182 and with the cut-out 181 of the collar 181 and the upper face of the flange section 181b.

In connection with the above, the antifriction element 180 may use a material high in lubricity. Further, as antifriction applying means, a material high in lubricity may directly be coated on the depressed grooves 111c in the arm 110. In this case, it is possible to delete the ball receiving element 182.

Furthermore, resilient or elastic elements 170 each in the form of a partial disc, each of which is made of a rubber material or the like and each of which is an example of the biasing means, are embedded respectively in the depressed recesses 111c in the arm 110. The subsidiary ball 121 is mounted on an upper face of each of the elastic elements 170 through a washer plate 171 such that a part of the subsidiary ball 121 projects from the depressed recess 111c.

In connection with the above, each of the elastic elements 170 should not be limited to one in the above-described embodiment. For example, a belleville spring or the like may be used as the elastic element 170. Moreover, the elastic element 170 may be provided on the side of the holder plate 130, in place of the side adjacent to the proximal section 111 of the arm 110.

An X-ring 100 made of an elastic material is arranged between the lower face of the proximal section 111 of the arm 110 and the upper face of the base plate 131, which are opposed to each other, so as to hermetically close a space between the lower and upper faces. The side of the X-ring 190 adjacent to the arm 110 is vulcanization-adhered to the proximal section 111 of the arm 110. By this X-ring 190, the grease filled in the space defined between the proximal section 111 of the arm 110 and the holder plate land the base plate 131 is prevented from escaping to the outside. Further, the X-ring 100 has a function of preventing duct and dirt from invading from the outside.

The spiral spring 150 that is an example of a spring has a proximal section 150a which is inserted into the cut-out groove 140e formed in an upper end section of the stationary shaft 140. The cut-out groove 140e has an edge portion at an upper end thereof which is caulked, whereby the spiral spring 150 is prevented from falling off from the stationary shaft 140. Further, the spiral spring has a free end 150b thereof which is engaged with an engaging shaft 151 provided integrally in the vicinity of the proximal section 111 of the arm 110. In this connection, the spring 150 may use a torsion coil spring which is similar to a conventional one.

The operation of the second embodiment according to the invention will next be described.

Figure 9:
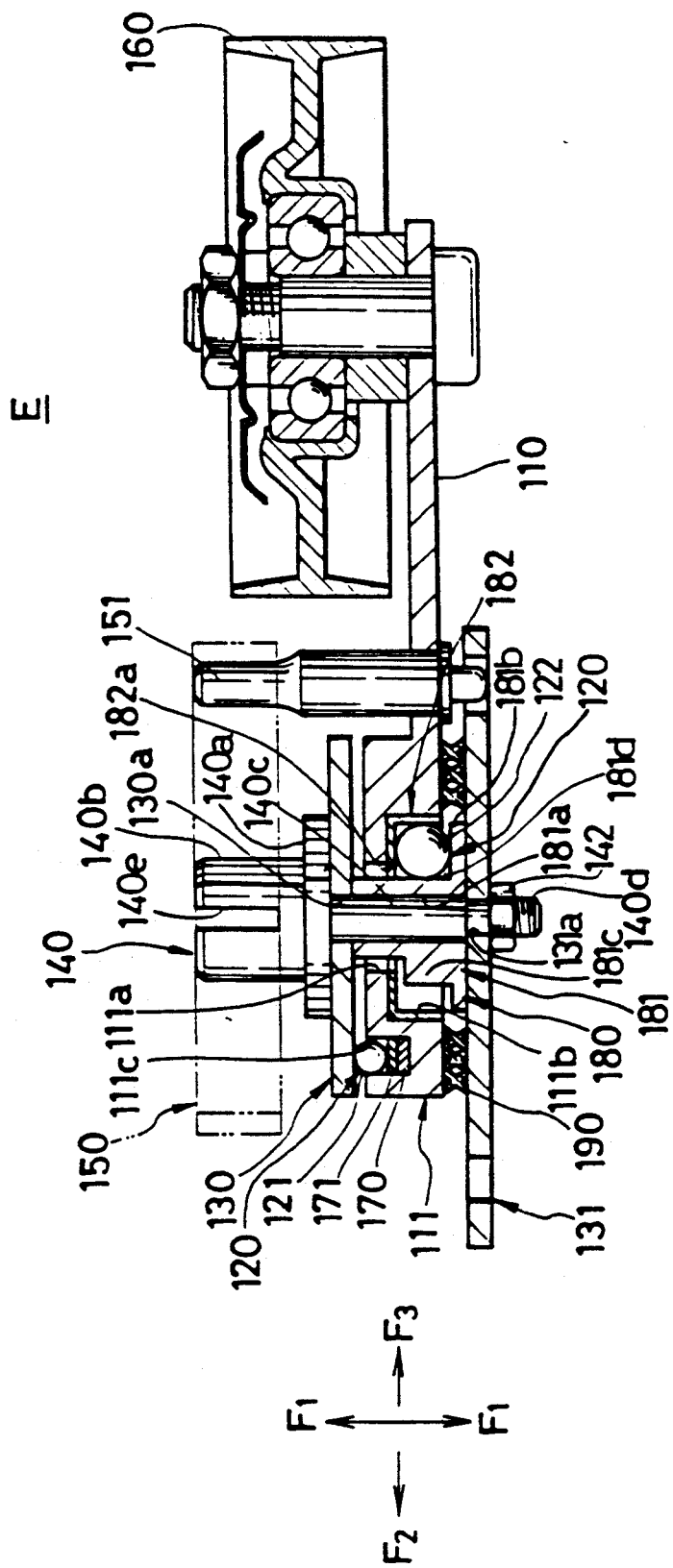
FIG. 9 is a cross-sectional view for explanation taken along a line IX—IX in FIG. 8.
Figure 10:
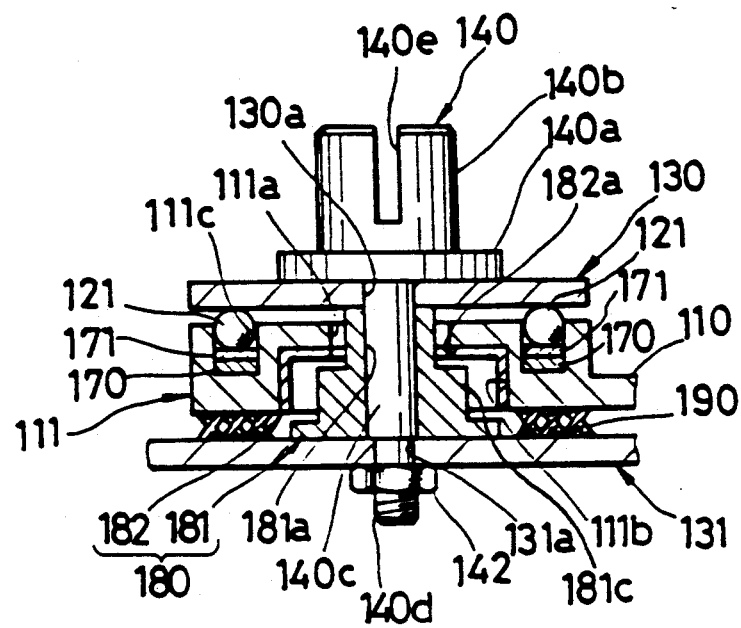
FIG. 10 is a cross-sectional view for explanation taken along a line X—X in FIG. 8.
Figure 11:
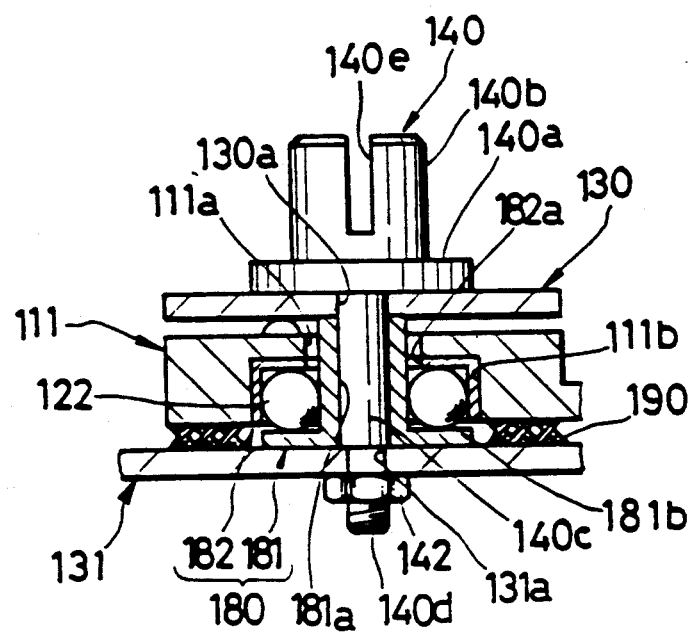
FIG. 11 is a cross-sectional view for explanation taken along a line XI—XI in FIG. 8.
Figure 12:
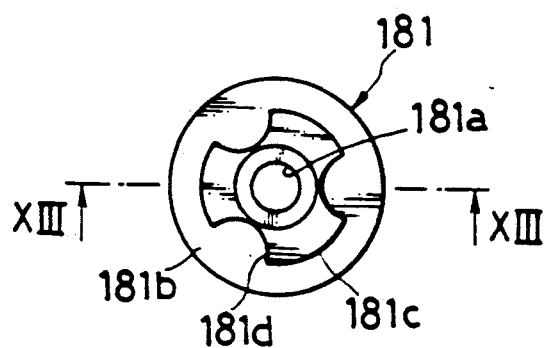
FIG. 12 is a top plan view for explanation of a collar according to the second embodiment of the invention.
Figure 13:
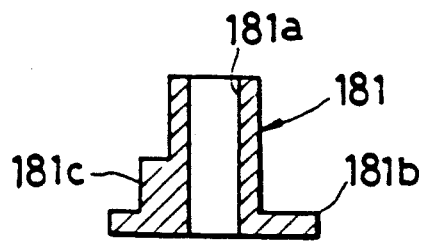
FIG. 13 is a cross-sectional view for explanation taken along a line XIII—XIII in FIG. 12.
Figure 14:
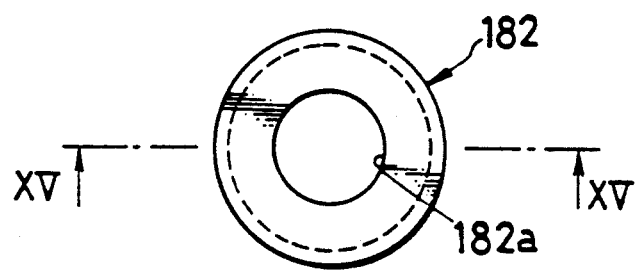
FIG. 14 is a top plan view for explanation of a ball receiving element according to the second embodiment of the invention.
Figure 15:
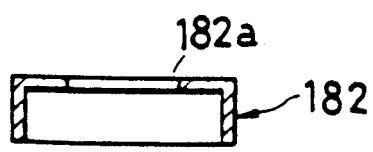
FIG. 15 is a cross-sectional view for explanation taken along a line XV—XV in FIG. 14.
Figure 16:
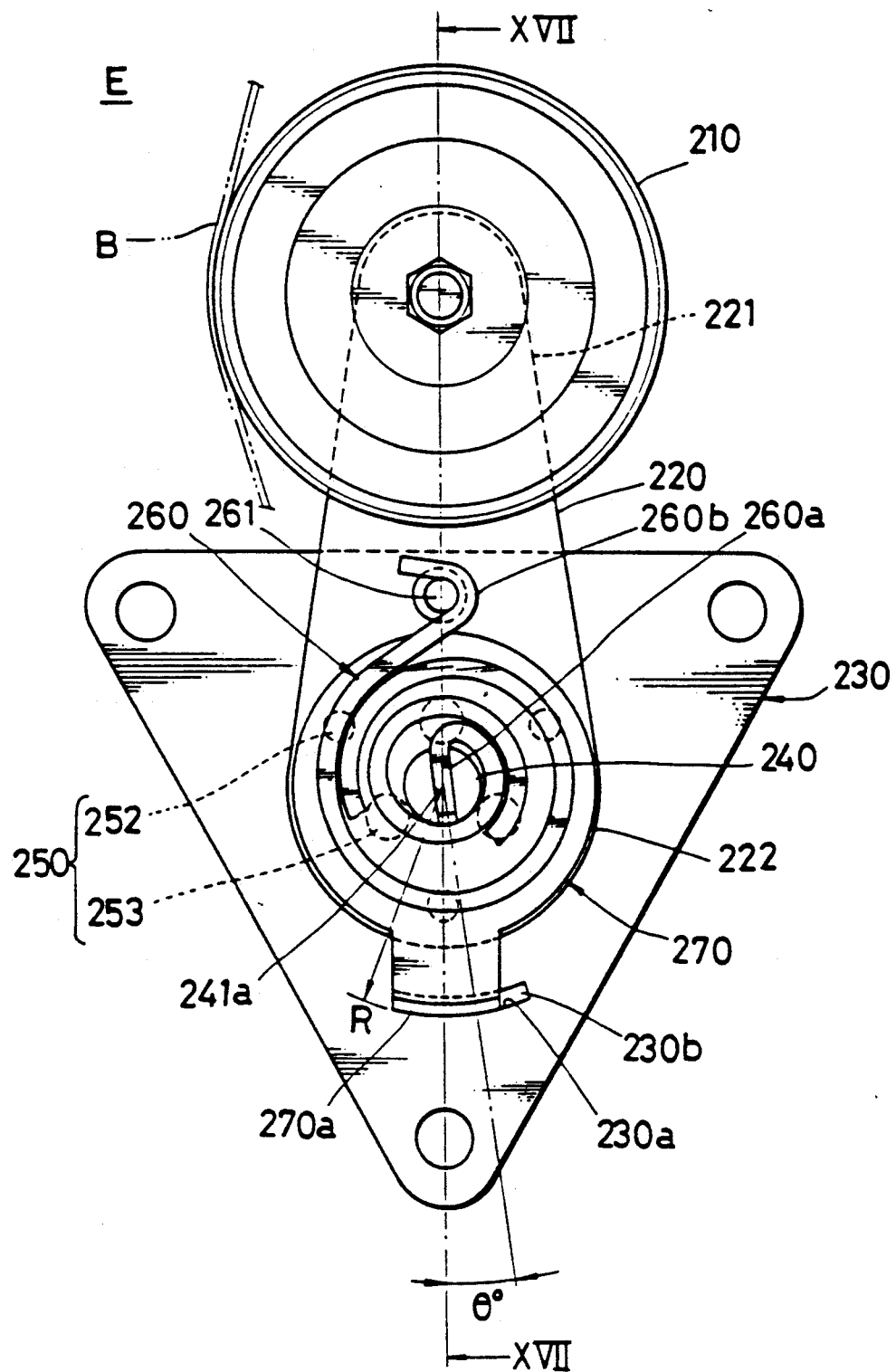
FIG. 16 is a top plan view for explanation of an automatic tensioner according to a third embodiment of the invention.
Figure 17:
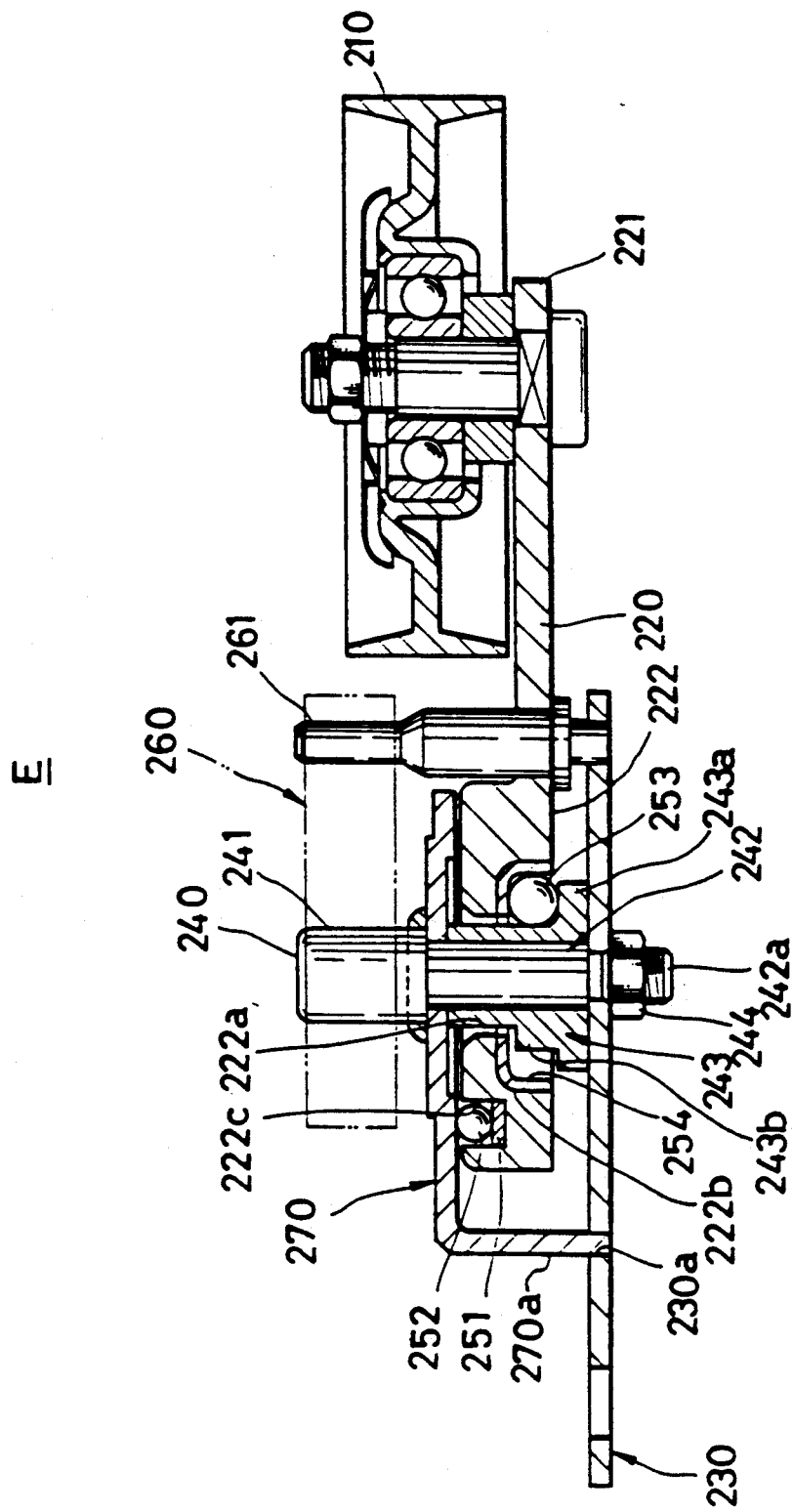
FIG. 17 is a cross-sectional view for explanation taken along a line XVII—XVII in FIG. 16.

In FIG. 9, cooperating actions between the subsidiary balls 121 and the holder plate and between the main balls 122 and the collar 181 and the ball receiving element 182 can cope with an input F1 in the axial direction, acting upon the idler pulley 160. Furthermore, an cooperating action between the main balls 122 and the collar 181 and the ball receiving element 182 can cope with inputs $F_2$ and $F_3$ in the radial direction, acting upon the idler pulley 160.

Here, in this embodiment as shown in FIG. 9, the subsidiary balls 121 are loosely fitted respectively in the depressed grooves 111c formed in the proximal section 111 of the arm 110. These subsidiary balls 121 are pressure-urged against the lower face of the holder plate 130 by the resilient or elastic force of the elastic element 170. Moreover the lower face of the X-ring 190 vulcanization-adhered to the proximal section 111 of the arm 110 is elastically pressure-urged against the base plate 131.

Thus, variation in dimension in the axial direction of the proximal section 111 of the arm 110, the holder plate land the base plate 131 can be absorbed by the elastic element 170 and the X-ring 190, particularly by the elastic element 170, making it possible to nullify mounting rattle in the axial direction on the side adjacent to the proximal section 111 of the arm 110.

As a result, it is possible to angularly move the arm 110 smoothly. Control or administration in dimensional accuracy in the axial direction of the proximal section 111 of the arm 110, the holder plate land the base plate 131 is made easy. This makes it possible to reduce the manufacturing cost.

Further, the angular movement of the arm 110 is effected about the stationary shaft 140 while rotating the main balls 122. A high surface pressure is loaded on the collar 181 and the ball receiving element 182 which support the main balls 122 rotatably. Since, however, the collar 181 and the ball receiving element 182 are made of the high-hardness material and are high in antifriction or wear and abrasion resistance, it is possible to prevent wear and abrasion.

Thus, heat treatment of the arm 110 and the base plate 131 can be dispensed with, making it possible to eliminate occurrence of thermal strain.

Furthermore, the X-ring 190, which is vulcanization-adhered to the proximal section 111 of the arm 110, is pressure-urged against the base plate 131 with a uniform contact pressure. Thus, it is possible to perfectly prevent the grease filled in the space defined by the proximal section 111 of the arm 110 and the holder plate land the base plate 131, from escaping to the outside.

Moreover, since the friction force with respect to the base plate 131 at a location adjacent to the proximal section 111 of the arm 110 can be uniformized by the X-ring 190, it is possible for the automatic tensioner E to have an attenuation or damping action. Thus, it is possible to prevent noises from occurring due to vibration of the engine or the like and abrupt load inputting, and to improve the durability of the automatic tensioner E.

Third Embodiment

Referring to FIGS. 16 through 25, there is shown an automatic tensioner E, according to a third embodiment of the invention, which applies a tension to a belt B such as a drive belt or the like of an engine for a vehicle. The automatic tension E has an arm 220. An idler pulley 210 is mounted, through a shaft, on the side adjacent to a free end 221 of the arm 220. The arm 220 has a proximal section 222 which is supported, through bearings 250, by a stationary shaft 240 upstanding on a base plate 230. A spring 260 is interposed between the stationary shaft 240 and the arm 220. By a biasing force of the spring 260, the idler pulley 210 is biased in one direction.

Particularly, this embodiment is characterized in that one side of a detent element 270 having an L-shaped cross-section is fixedly mounted on the stationary shaft 240 such that the proximal section 222 of the arm 220 is clamped between the base plate and the detent element 270, and the other side of the detent element 270 is fixedly mounted on the base plate 230.

Further, this embodiment is characterized in that an elongated bore 230a extending about the stationary shaft 240 is formed in an abutment of the base plate against the detent element 270 the other side of the detent element 270 is loosely fitted in the elongated bore 230a, and a spacer 280 is capable of being fitted in one side of the elongated bore 230a such that the detent element 270 is moved angularly in a direction tightening the spring 260.

A structure or construction of this embodiment will next be described in further detail, The proximal section 222 of the arm 220 is formed into a circular cylinder, and has a through bore 222a extending along an axis of the proximal section 222. A recess 222b in the form of a concentric cup is formed in a lower face of the proximal section 222 in communication with the through bore 222a. Further the proximal section 222 has an upper face which is formed with three (3) circular depressed grooves 222c arranged in predetermined intervals, for example, in equidistantly spaced relation to each other, on a circumference concentric with the through bore 222a on the outside of the recess 222b. Smaller-diameter subsidiary balls 252 each of which is an example of a bearing are loosely fitted respectively in the depressed grooves 222c through respective washer plates 252 such that a part of each of the subsidiary balls 252 projects from the associated depressed groove 222c.

In connection with the above in this embodiment, each of the depressed grooves 222c is formed in the outside of the recess 222b. However, the depressed grooves 222c may be formed on the circumference the same as that on which the recess 222b is arranged.

The stationary shaft 240 is composed of a larger-diameter section 241 and a smaller-diameter section 242.

A threaded section 242a is formed in a lower portion of the smaller-diameter section 242. One side of the detent element 270 and a collar 243 are inserted about the smaller-diameter section 242. The one side of the detent element 270 is welded such that an upper face of the detent element 270 is abutted against a lower face of the larger-diameter section 241. Furthermore, the base plate 230 is inserted about the threaded section 242a. A nut 244 is tightened to the threaded section 242a projecting from the base plate 230, whereby the stationary shaft 240 is fixedly mounted on the base plate 230. In this connection, the base plate 230 is fixedly mounted on a mounting bracket (not shown) of the engine.

The collar 243 is made of a high-hardness material. A flange section 243A is formed on a lower end of the collar 243, and a bulge section 243b is formed on the outer peripheral surface of the collar 243. Three (3) arcuate cut-outs 243c are formed in the outer peripheral surface of the bulge section 243b at predetermined intervals, for example, at the same intervals in communication with the flange section 243a. Each of the cut-outs 243c has a radius of curvature which is set to one at least equal to or larger than the radius of each of the larger-diameter main balls 253 each of which is an example of the bearing.

A cup-like ball receiving element 234 made of a high-hardness material is fitted in the recess 222b in the arm 220. A bore 254a concentric with the through bore 222a in the arm 220 and identical in diameter therewith is formed in a bottom face of the ball receiving element 234. The main balls 253 are so arranged as to be in contact with the inner peripheral surface of the ball receiving element 254, the cut-outs 243c in the collar 243 and the upper face of the flange section 243a.

The other side of the detent element 270 forms a bent or folded section 270a in which the other side of the detent element 270 is folded into an L-shape toward the base plate 230. The folded section 270a is arranged on the circumference having a radius R about the stationary shaft 240. Further, the folded section 270a has a forward end which is loosely fitted in the arcuate elongated bore 230a formed in the base plate 230 and extending about the stationary shaft 240. The elongated bore 230a has one side (left-hand side in FIG. 22) which is formed such that the spacer 280 having an L-shaped cross-section can be fitted in the one side of the elongated bore 230a.

The spiral spring 260, which is an example of the spring, has a proximal section 260a which is inserted through a cut-out groove 241a formed in the upper end of the larger-diameter section 241 of the stationary shaft 240. The cut-out groove 241a has an edge portion at the upper end thereof which is caulked, whereby the spiral spring 260 is prevented from falling off from the stationary shaft 240. Furthermore, the spiral spring 260 has a free end portion 260b which is engaged with an engaging shaft 261 upstanding at a location adjacent to the proximal section 222 of the arm 220.

In connection with the above, a coil spring may be used in place of the spiral spring 260.

The operation of the third embodiment will next be described.

Figure 18:
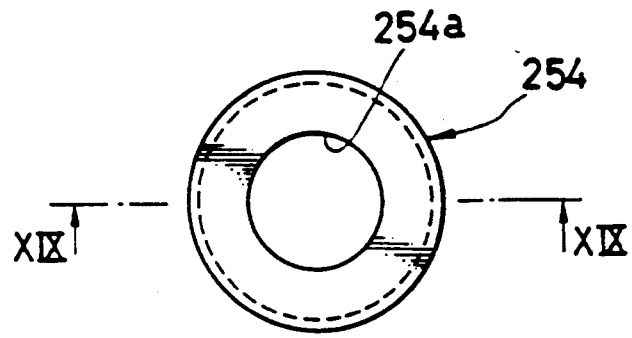
FIG. 18 is a top plan view for explanation of a collar according to the third embodiment of the invention.
Figure 19:
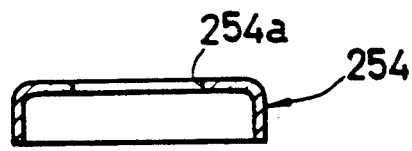
FIG. 19 is a cross-sectional view for explanation taken along a line XIX—XIX in FIG. 18.
Figure 20:
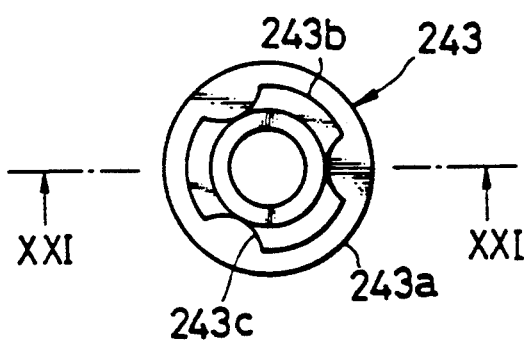
FIG. 20 is a top plan view for explanation of a ball receiving element according to the third embodiment of the invention.
Figure 21:
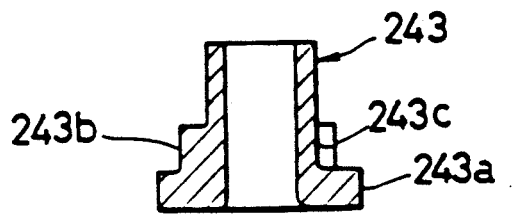
FIG. 21 is a cross-sectional view for explanation taken along a line XXI—XXI in FIG. 20.
Figure 22:
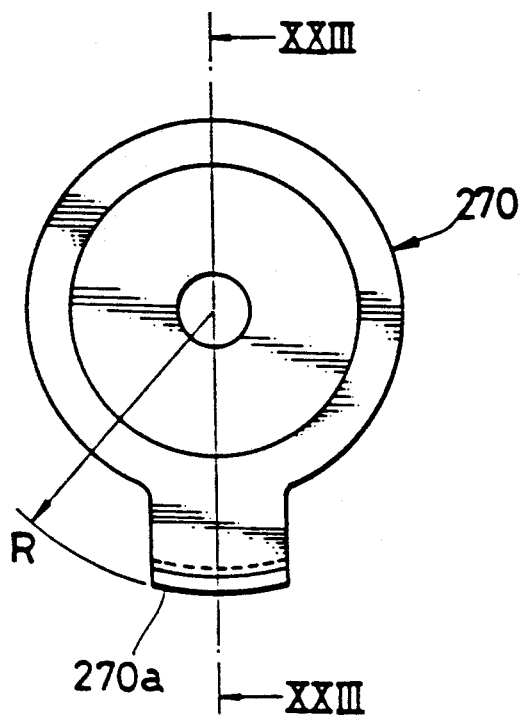
FIG. 22 is a top plan view for explanation of a detent element according to the third embodiment of the invention.

In FIG. 18, the idler pulley 210 is pressure-urged against the belt B by the biasing force of the spiral spring 260, thereby applying a tension to the belt B. Under this condition, the folded section 270a of the detent element 270 is abutted against the left-hand end face of the elongated bore 230a in the figure, so that a gap 230b is defined between the right-hand end face of the elongated bore 230a and the folded section 270a.

Figure 27:
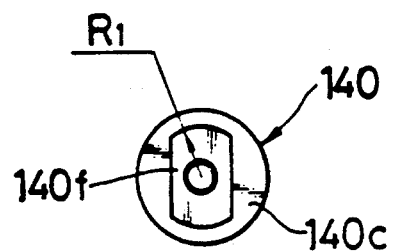
FIG. 27 is a view showing a configuration of a deformed section of the stationary shaft in FIG. 20.

Here, as shown in FIGS. 28 and 27 the stationary shaft 140 in the second embodiment is such that a deformed section 140f having a two-face width and serving as positioning of a spring-setting angle is fitted in a bore 131a formed in the plate 131, and is fixedly mounted to the nut 142. In this case, a torque T applied to the stationary shaft 140 by the spring is brought to $F_1 R_1$ ($F_1$ is load, while $R_1$ is a radius of the portion 140f). Since the radius $R_1$ is small, the load $F_1$ becomes inevitably large. For this reason, a surface pressure applied to the deformed section 140f of the stationary shaft 140 becomes large. Thus, there is a fear that breakage of the stationary shaft 140 and deformation of the plate 131 occur.

Figure 26:
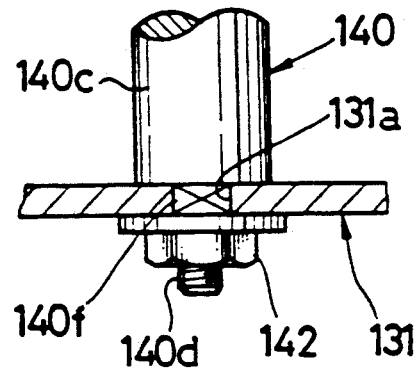
FIG. 26 is a cross-sectional view showing a fixed or stationary section of a fixed or stationary shaft in the second embodiment.

Here, the torque T applied to the stationary shaft 240 becomes FR if the load F acting upon the point of application. This torque T is the same as that in the case of the second embodiment illustrated in FIGS. 26 and 27. Since, however, the radius R can be set to one considerably larger than the radius $R_1$ in S the second embodiment, it is possible to considerably reduce the load F less than the conventional load $F_1$. As a result, it is possible to considerably reduce the surface pressure applied to the stationary shaft 240 less than that in the second embodiment. Accordingly, it is possible to considerably improve the durability of the stationary shaft 240, and to prevent the base plate 230 from being deformed.

Furthermore, in the second embodiment, there is a possibility that the position of the spring-setting angle varies depending upon dimensional errors of the deformed section 140f of the stationary shaft 140 and the bore 131a in the plate 131, so that there cannot be obtained a predetermined torque.

To the contrary, in the third embodiment, since the torque is set at a location where the radius is large, it is possible to obtain a predetermined torque with high or superior accuracy.

Figure 23:
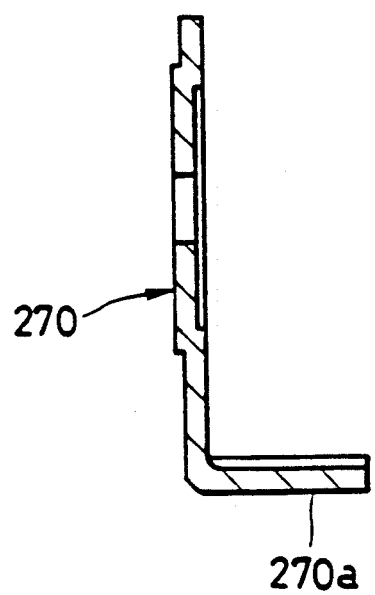
FIG. 23 is a cross-sectional view for explanation taken along a line XXIII—XXIII in FIG. 22.
Figure 24:
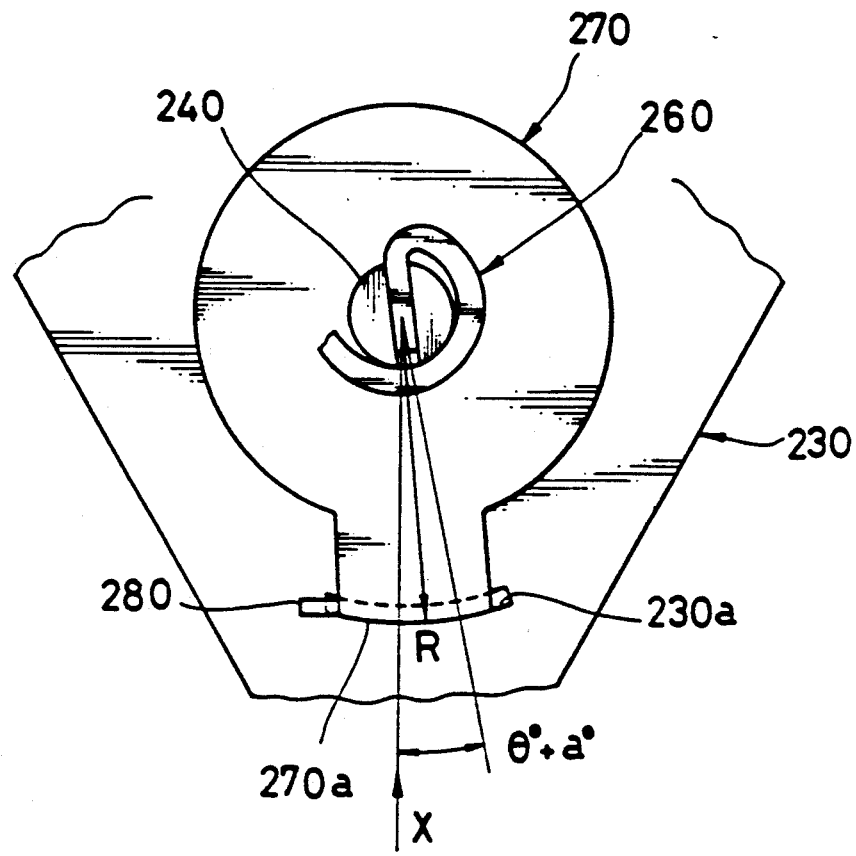
FIG. 24 is a top plan view showing a condition of the detent element at mounting of a spacer, according to the third embodiment of the invention.
Figure 25:
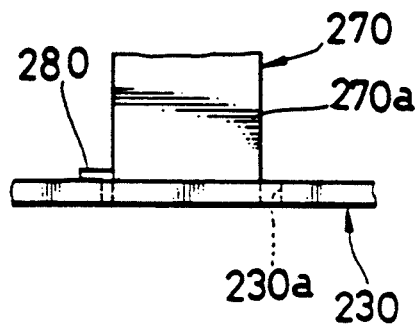
FIG. 25 is a view for explanation as viewed from the arrow XXV in FIG. 24.

Moreover, when the torque is finely adjusted as shown in FIGS. 24 and 23, a plurality of spacers 280 different in plate thickness are prepared and an appropriate spacer 280 is fitted in a location adjacent to the left-hand end face of the elongated bore 230a. Thus, the stationary shaft 240 is moved angularly by a° in the counterclockwise direction than θ° illustrated in FIG. 10, and the spiral spring 260 is tightened so that it is possible to increase the torque.

We claim:

1. An automatic tensioner for applying a tension to a belt of an engine for a vehicle, said automatic tensioner comprising:
   a shaft fixedly mounted on a part of the vehicle;
   an arm having a proximal section supported by said shaft for angular movement thereabout and a free end section located on the side opposite to said proximal section;
   a pulley supported by said free end section of said arm for angular movement thereabout and in contact with said belt;
   a plate element fixedly mounted on said shaft;
   a plurality of rolling elements arranged between said proximal section of said arm and said plate element and capable of rolling between them;
   biasing means for causing said arm to be moved angularly about said shaft, to bias said pulley toward said belt; and
   an elastic element biasing said rolling elements in an axial direction of said shaft.

2. An automatic tensioner according to claim 1, wherein said biasing means includes spring means.

3. An automatic tensioner according to claim 1, wherein at least one of said plate element and said arm has recessed abutted against said rolling elements.

4. An automatic tensioner for applying a tension to a belt of an engine for a vehicle, said automatic tensioner comprising:
   a shaft fixedly mounted on a part of the vehicle; p1 an arm having a proximal section supported by said shaft for angular movement thereabout and a free end section located on the side opposite to said proximal section;
   a pulley supported by said free end section of said arm for angular movement thereabout and in contact with said belt;
   a plate element fixedly mounted on said shaft;
   a plurality of rolling element arranged between said proximal section of said arm and said plate element and capable of rolling between them;
   biasing means for causing said arm to be moved angularly about said shaft to bias said pulley toward said belt, said biasing means including spring means; and
   a detent element for preventing said shaft from being moved angularly about an axis thereof, said detent element having a proximal end fixedly mounted on said shaft and a forward end fixedly mounted on said plate element.

5. An automatic tensioner according to claim 4, including a slot formed in an abutment of said plate element against said detent element and extending about said shaft, said detent element having a forward end which is loosely fitted in said slot, and a spacer capable of being arranged on one side of said slot such that said detent element is moved angularly in a direction tightening said spring means.

6. An automatic tensioner according to claim 1, wherein aid rolling elements are formed by a ball bearing.

7. An automatic tensioner according to claim 1, wherein said rolling elements are formed by a needle bearing, and wherein said automatic tensioner further includes a metal sliding bearing which is fitted about said shaft and which is abutted against and supports the proximal section of said arm for angular movement about said shaft.

8. An automatic tensioner for applying a tension to a belt of an engine for a vehicle, said automatic tensioner comprising:
   a shaft fixedly mounted on a part of the vehicle;
   an arm having a proximal section supported by said shaft for angular movement thereabout and a free end section located on the side opposite to said proximal section;
   a pulley supported by said free end section of said arm for angular movement thereabout and in contact with said belt;
   a plate element fixedly mounted on said shaft;
   a plurality of rolling elements arranged between said proximal section of said arm and said plate element and capable of rolling between them;
   biasing means for causing said arm to be moved angularly about said shaft to bias said pulley toward said belt; and an X-ring arranged between an end face of said proximal section of said arm and an end face of said plate element, which are opposed to each other, to hermetically close a location between said end faces.

9. An automatic tensioner according to claim 1, including antifriction means arranged at an abutment of at least one of said proximal section of said arm and said plate element, which is abutted against said rolling elements.

10. An automatic tensioner according to claim 9, wherein said antifriction means includes an antifriction element.

* * * * *